April 9, 1957 R. C. FERGASON 2,787,880
MOISTENING MEANS FOR COTTON PICKER
Filed June 18, 1953 4 Sheets-Sheet 3

Inventor
Rector R. Fergason
by W. Hewitt
Attorney

United States Patent Office 2,787,880
Patented Apr. 9, 1957

2,787,880

MOISTENING MEANS FOR COTTON PICKER

Rector C. Fergason, Gadsden, Ala., assignor to Allis-Chalmers Manufacturing Company, Milwaukee, Wis.

Application June 18, 1953, Serial No. 362,651

16 Claims. (Cl. 56—41)

This invention relates to cotton pickers, and it is concerned more particularly with a mechanism or system for wetting rotary picking spindles with liquid such as water which will condition the spindles for taking hold of cotton lint and winding it up, and which will also facilitate stripping of the wound up cotton from the spindles. The present application is a continuation in part of application Serial No. 114,969, now Patent 2,671,298, filed on September 10, 1949, for Cotton Picker.

In cotton picking machines of the rotary spindle type it has heretofore been common practice to apply a fluid such as water to the spindles before they are moved into picking position. For that purpose various types of spindle moistening devices have been employed and, ordinarily, such moistening devices are arranged one above the other, that is, in a vertical series. Moistening fluid is fed to the individual moistening devices from a fluid storage tank which is mounted on the machine and which has sufficient capacity for at least several hours of picking.

The amount of liquid which is fed to the moistening devices and applied to the spindles should not be greater than necessary for obtaining effective spindle operation. If an excess of liquid is fed to the moistening devices and spindles, the harvested cotton will be unduly wet and will bring a reduced price as it is difficult to gin excessively wet cotton. Also, wet cotton cannot be stored satisfactorily because it will mildew. An excessive or inefficient liquid supply to the spindle moistening devices is further objectionable because of the possibility of resulting rust damage to the operating parts of the machine, and because of the unduly rapid depletion of the liquid storage receptacle on the machine.

On the other hand, the liquid supply should be adequate to take care of prevailing requirements which vary within wide limits. For instance, on a hot, sunny day more spindle moistening liquid will be required for harvesting a given amount of cotton, than is required for the harvesting of the same amount of cotton from the same field on a humid, cloudy day.

Another requirement for the wetting of picking spindles which are conventionally arranged in vertical rows is that when the moistening devices at the lower part of the machine are functioning, the upper moistening devices should be functioning without accidental interruptions. In moistening systems employing supply lines of different lengths leading to the individual moistening devices, the shorter lines may, under certain conditions, be drained by siphoning action of the longer pipes, and as a result, such systems as heretofore employed have presented difficulties from an engineering and performance standpoint.

Generally, it is an object of this invention to provide an improved rotary spindle type cotton picking machine which will take care of the hereinbefore outlined requirements and shortcomings in a practical and fully satisfactory manner.

More specifically, it is an object of the invention to provide an improved spindle moistening system wherein the amount of liquid which is supplied to the moistening devices may readily be regulated so that the proper amount of liquid will be applied to the spindles under varying operating conditions, as outlined hereinbefore.

Another object of the invention is to provide an improved combination force feed and gravity feed fluid supply system for spindle moistening devices of a cotton picker.

Another object of the invention is to provide an improved drive mechanism for a fluid supply system of the hereinabove outlined character.

A further object of the invention is to provide an improved fluid distributing manifold for use in a spindle moistening system of the hereinabove outlined character.

The foregoing and other objects and advantages are attained by the present invention, various novel features of which will be apparent from the description herein and the accompanying drawings, disclosing embodiments of the invention, and will be more particularly pointed out in the appended claims.

Referring to the drawings:

Fig. 6 is an enlarged elevational view generally in the direction of arrow V in Fig. 1, showing a vertical series of spindle moistening devices and adjacent parts;

Figure 1:
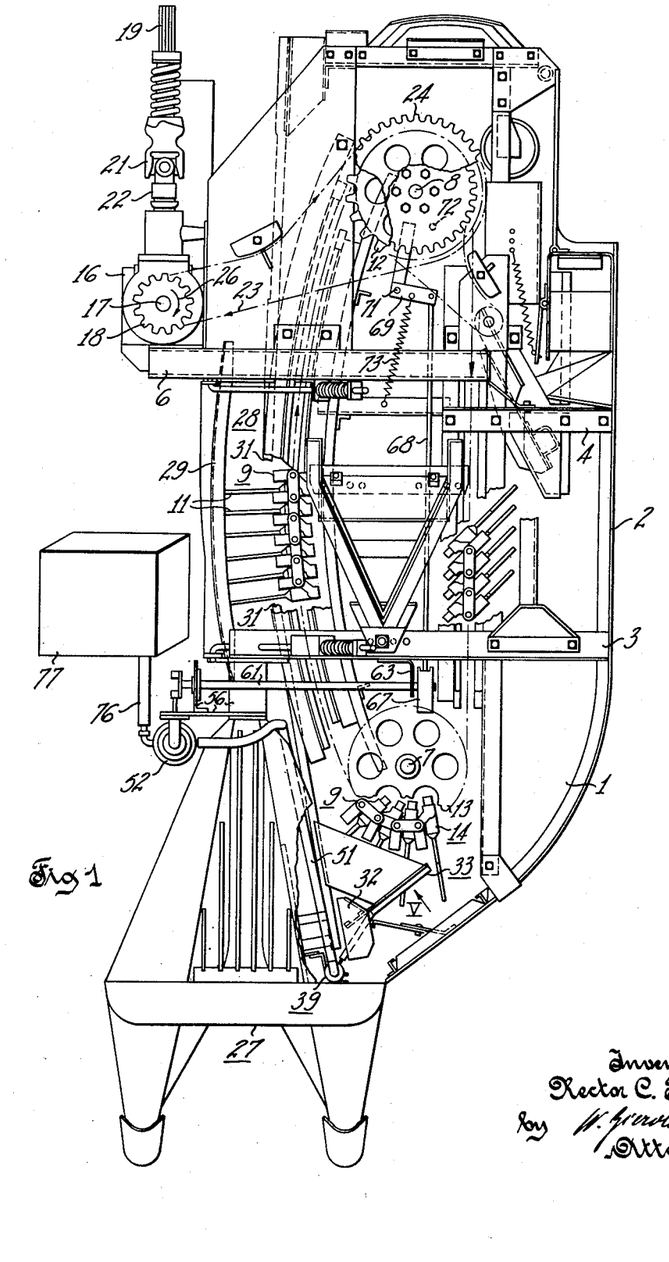
Fig. 1 is a top view of a rotary spindle type cotton picking mechanism, parts being broken away for purposes of exposure, and a tank for storing spindle moistening fluid being diagrammatically indicated at the left side of the figure.

The picking mechanism shown in Fig. 1 represents a unitary structure which, in operation, is advanced along a row of cotton plants by a suitably constructed, self-propelled supporting vehicle, not shown, and on which vehicle the unit is mounted for up and down adjustment relative to the ground. A rigid main frame assembly which serves as a mounting base or support for various parts of the unit comprises a number of interconnected component elements including a bottom plate 1, an upright outer side wall 2, and cross frame members 3, 4 and 6.

Rotatably mounted on the main frame structure of the picker unit are front and rear vertical shafts 7 and 8, and an endless slat belt structure 9 carrying rotary picking spindles 11 is trained around the shafts 7 and 8 in conventional manner. The rear vertical shaft 8 mounts an upper slat belt drive sprocket 12 and a corresponding lower slat belt drive sprocket, not shown; the sprockets being spaced a predetermined vertical distance from each other and secured to the shaft for rotation in unison therewith. The front vertical shaft 7 mounts a top idler 13 and a corresponding bottom idler, not shown.

The slat belt 9 is of generally conventional construction and comprises a series of spindle carrying slats 14 which extend vertically side by side and are pivotally movable relative to each other within predetermined limits, all in conformity with well-known principles. Each slat 14 is equipped with a vertical row of horizontally extending picking spindles 11, an upper part of one of the slats and associated picking spindles being shown in detail in Fig. 6. The relative vertical spacing of the spindles is the same in each slat, and the individual slats are mounted and arranged in such a manner that movement of the slat belt 9 around the front and rear shafts 7 and 8 will cause movement of the spindles in parallel planes extending horizontally at predetermined vertical spacings from each other. Thus, if each slat has, let us say, sixteen spindles, there will be sixteen horizontal rows of picking spindles moving in sixteen vertically spaced horizontal planes.

Referring again to Fig. 1, a gear casing 16 is rigidly mounted on a rearward side portion of the picker main frame, and a vertically extending sprocket shaft 17 is rotatably mounted in the casing 16 and has a sprocket wheel 18 secured to its upper end for rotation therewith. A spline shaft 19 is connected by a universal joint 21 with a horizontal shaft 22 which is journaled in the casing 16 and has a suitable driving connection, as by a pair of bevel gears, not shown, within the casing 16 with the vertical sprocket shaft 17. A chain 23 is trained around the sprocket wheel 18 on the shaft 17 and around another sprocket wheel 24 which is secured to the upper end of the rear vertical shaft 8.

The propelling vehicle on which the picking mechanism is mounted as outlined hereinbefore, is equipped with a suitable power transmitting mechanism, not shown, for applying driving power from the vehicle engine to the spline shaft 19. The arrow 26 in Fig. 1 indicates the normal direction of rotation of the shaft 17, and when engine power is applied to the shaft 19 to cause rotation of the shaft 17 in the direction of arrow 26, the resulting rotation of rear shaft 8 will be transmitted to the slat belt structure 9 and move the latter about the front and rear shafs 7 and 8. A sheet metal structure serving as a plant divider and generally indicated in Fig. 1 by the reference character 27 is mounted on the picker main frame in conventional manner, and a picking tunnel 28 is formed in rear of the divider 27 between an upright side wall 29 and an arcuate guide structure 31 for the slat belt 9. In operation, the picking spindles 11 move rearwardly in endless succession through the picking tunnel 28, and during such rearward movement the spindles are rotated on their axes by means of a conventional friction drive mechanism, not shown.

Adjacent the plant divider 27 and carried by a vertically extending frame member 32 supported on bottom plate 1 is a vertical series of spindle moistening means or devices 33 (Fig. 6) each of which may consist of several layers of resilient material 34 such as rubber clamped against a supporting strap 36 which is secured to and projects laterally from the frame member 32. A short piece of rubber hose 37 is attached to each strap 36 in position to conduct moistening fluid, such as water, to the resilient material 34 by means of a channel forming clamp 38. Adjoining layers of resilient material 34 extend sufficiently far from their respective clamping means so that when a picking spindle is not therebetween, the adjacent ends of the resilient members are in contact and function to maintain moistening fluid therebetween and between the layers of individual moistening pads by hydrostatic action. The picking spindles 11 pass between adjoining moistening devices 33 and upon contacting the layers 34 become moistened just prior to the entry of the spindles into the picking tunnel 28.

Figures 2, 3, 4, 5:
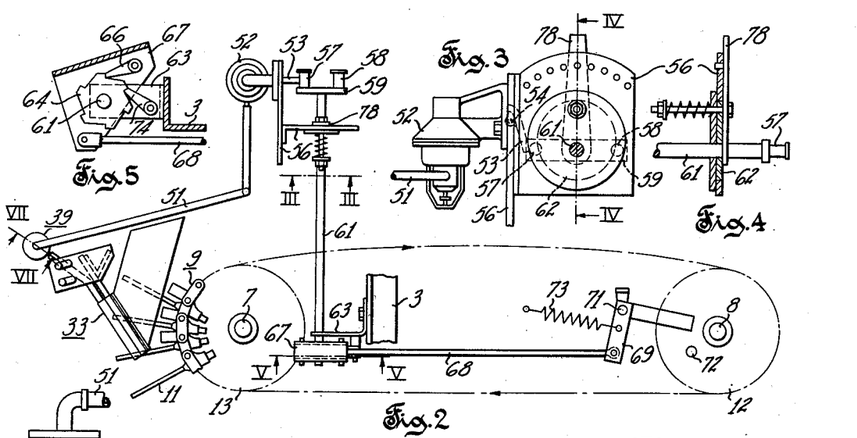
Fig. 2 is a diagrammatic plan view of a spindle moistening system incorporated in the mechanism shown in Fig. 1.
Fig. 3 is an elevational view of the fluid pump and associated parts shown in Fig. 2, the view of Fig. 3 being taken in section on line III—III of Fig. 2.
Fig. 4 is a section on line IV—IV of Fig. 3.
Fig. 5 is a section on line V—V of Fig. 2.
Figures 7, 8:
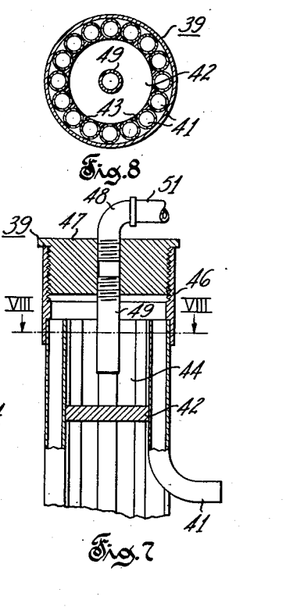
Fig. 7 is an enlarged section on line VII—VII of Fig. 2, showing a distributor casing and pipes which are associated with the spindle moistening devices as shown in Fig. 6.
Fig. 8 is a section on line VIII—VIII of Fig. 7.

A fluid distributor device or casing generally indicated by the reference character 39 is fixedly mounted on the main frame structure of the picker unit in proximity to the spindle moistening devices 33 as indicated in Fig. 6. The device 39 comprises a series of tubes or fluid conducting means 41 of varying lengths which extend generally vertical and are connected at their lower ends with the rubber hoses 37 of the individual moistening devices. The upper ends of the tubes 41 are arranged in a circle around an imperforate disk member or bottom wall 42 as best shown in Figs. 7 and 8. The upper ends of the tubes or fluid distributing conduits 41 extend upwardly beyond the disk member 42 and are bonded together and to the disk 42, as by solder 43 so as to form a water tight container or well 44 in elevated relation to the spindle moistening devices 33 and having the aforesaid disk 42 as the bottom thereof. It will be noted that the solder forms a horizontal peripheral portion around the circle of tubes in elevated relation to the bottom wall 42. A sleeve or closure wall 46 surrounds the upper end of the container 44 and forms an upward extension of the water tight container 44. At its upper end the container 44 is closed by a cover element or top wall 47 which mounts fluid intake means including an elbow 48 and a nipple 49, constituting intake means, in a central axial bore through the cover as best shown in Fig. 7. The elbow 48 is connected with a hose or pipe line 51 which leads to a fluid pump 52 as shown in Figs. 1 and 2 and as will be explained more fully hereinbelow. The elbow 48 and pipe line 51 constitute means for connecting the pump 52 to the container 44. The nipple 49 is threaded into the axial bore of the cover 47 from below in line with the elbow 48 and extends downwardly into the container 44 to a level below the upper ends of the tubes 41. The nipple 49 has a terminal discharge end positioned to direct incoming fluid toward the bottom wall 42 of container 44. The upper ends of the tubes 41 constitute overflow outlets from the container 44, and since all tubes are of the same cross sectional size and all extend the same distance above the bottom wall of the container, the overflow from the container will be the same to each tube.

Referring to Fig. 3, the fluid pump 52 is of conventional construction and has a pivoted actuating lever or driven element 53 which is swingably supported at a pivot center 54. The pump 52 is supported on the main frame structure by means of a bracket assembly 56 which, as shown in Fig. 1, is secured to the cross frame member 3. The lever 53 is actuated by eccentric rollers 57 and 58 which are mounted on a bar 59 attached to a jack shaft 61. Jack shaft mounting means in the form of an eccentrically shiftable, bearing carrying disk 62 rotatably supports the jack shaft 61 at one end, the other end thereof being rotatably supported by a bracket 63 secured to cross-frame member 3, as shown in Fig. 1. The end of jack shaft 61 adjacent to bracket 63 mounts a ratchet wheel 64 (Fig. 5) which is actuated by a pawl 66 pivotally supported on a yoke 67 which in turn is pivotally mounted on shaft 61. A rod 68 has its forward end pivotally attached to the lower end of yoke 67 (Fig. 5) and has its other end (Fig. 2) pivotally attached to one arm of a spring biased bell crank lever 69 pivoted at 71 on the main frame structure.

Referring to Figs. 1 and 2, a cam roller or driving element 72 constituting part of power transmitting means is mounted on the slat belt drive sprocket 12 and positioned to engage the other arm of the bell crank lever 69. Each revolution of the sprocket 12 will pivot the bell crank on its center 71 against the bias of spring 73 and then release it for return into the position shown in Fig. 2. Pivotal movement of lever 69 in anticlockwise direction, as viewed in Fig. 2, causes rod 68 to move to the right as viewed in Figs. 2 and 5, thereby pivoting yoke 67 counterclockwise about jack shaft 61 and causing pawl 66 to engage ratchet wheel 64 and turn same. The action of spring 73 returns bell crank 69 to the position shown in Fig. 2 when the cam roller 72 moves out of contact with the free arm of the bell crank lever, and as a result, rod 68, yoke 67 and pawl 66 return to the position shown. A pawl 74 pivotally mounted on bracket 63 functions to retain ratchet wheel 64 in the position to which it was moved by operating pawl 66. It should now be obvious that the revolution of sprocket 12 results in the pair of rollers 57, 58 sequentially contacting one end of pump actuating lever 53. Each actuating stroke of lever 53 will result in a discharge of fluid with the discharge of fluid from the pump being at a rate proportional to the speed of rotation of the sprocket 12.

As diagrammatically indicated in Fig. 1, means in the form of a hose 76 connects the intake of pump 52 with a suitable source of moistening fluid, for example, a fluid storage receptacle 77 which is mounted in a convenient location on the machine, preferably under the driver's seat, not shown. The hose 76, pipe 51, elbow 48 and nipple 49 constitute fluid inlet means connecting the receptacle 77 with the container 44. The amount of fluid which is supplied from the receptacle 77 to the fluid container 44 is proportional to the driving power applied to the pump 52 and can readily be varied by adjusting the position of a hand lever 78, shown in Figs. 3 and 4, attached to disk 62, which adjustment through the eccentric mounting of shaft 61 moves rollers 57 and 58 closer to or farther away from lever 53 to thereby increase or decrease the pumping stroke as desired.

It should now be apparent that the spindle moistening mechanism disclosed by Figs. 1 to 8 provides each spindle with a substantially equal amount of moistening fluid since the pressure head of fluid in container 44 is the same for all outlet or drain tubes 41 and since the variation in vertical lengths of these tubes compensates for the increased friction losses inherent in the longer tubes. In addition, it should also be apparent that the quantity of moistening fluid supplied to the spindles is proportional to the speed of operation of the picking unit at all times and that the proportion may be varied, as desired, by adjusting the position of lever 78.

For example, if the self-propelled vehicle on which the picking unit is mounted is equipped, as usual, for picking selectively at either a high speed or a low speed, operation of the machine at the low speed will require and provide less moistening fluid per minute than operation of the machine at the high speed. If the picker is stopped, the flow of fluid to container 44 immediately stops. This last feature is a definite advantage over an ordinary gravity flow system in that with a gravity system of conventional type fluid would continue to flow when the picker is stopped if the operator should inadvertently fail to shut off the fluid source. In an ordinary gravity feed system, the proper amount of fluid for the low speed operation of the picker would be entirely inadequate for the high speed operation without an adjustment of a suitable needle valve metering the fluid to the spindle moistening devices. On the other hand, if the amount of fluid is adjusted for high speed operation there will be an excess of fluid provided if the picker is adjusted to low speed operation to meet particular field conditions, and such operation at the low speed will result in harvesting excessively moistened cotton (which will bring a reduced price) and in the corrosion of the picker parts contacted by the excess fluid.

In addition, in an ordinary gravity feed system which employs a needle valve or the like for metering the flow of fluid to the spindles, such flow is constant for a particular setting of the valve. Consequently, a very delicate adjustment of the needle valve is required to obtain the proper amount of flow as a relatively small amount of fluid provides the most efficient picking. Moreover, the water which is ordinarily used in the moistening devices is sometimes contaminated with material which interferes with the efficient operation of a needle valve, thus rendering it difficult to initially obtain the desired rate of flow and practically impossible to maintain such flow. In the system of Fig. 2, the pump intermittently transmits fluid to the container 44 and the amount of fluid being delivered can be readily varied by moving lever 78, and once the correct rate of flow has been determined for any one speed and for the condition of the crop, this rate of flow will be correct for any other speed of picker operation thereby avoiding the nuisance of having to manually adjust the flow when different field conditions demand operation of the picker at a different speed.

The modified spindle moistening system shown in Figs. 9 to 16, inclusive, involves generally the same mode of operation as the system disclosed and explained hereinbefore in connection with Figs. 1–8, inclusive. That is, the system of Figs. 9 to 16, inclusive, like the system of Figs. 1 to 8, inclusive, includes a fluid pump which is operable to discharge spindle moistening fluid at a rate proportional to the driving power applied to said pump, and power transmitting means operable independently of the picking mechanism to selectively transmit different amounts of driving power from a power input element, such as the slat belt drive sprocket 12, to said pump and thereby cause delivery of spindle moistening fluid at different rates without varying the operating speed of the picking mechanism.

Figures 9, 10, 11:
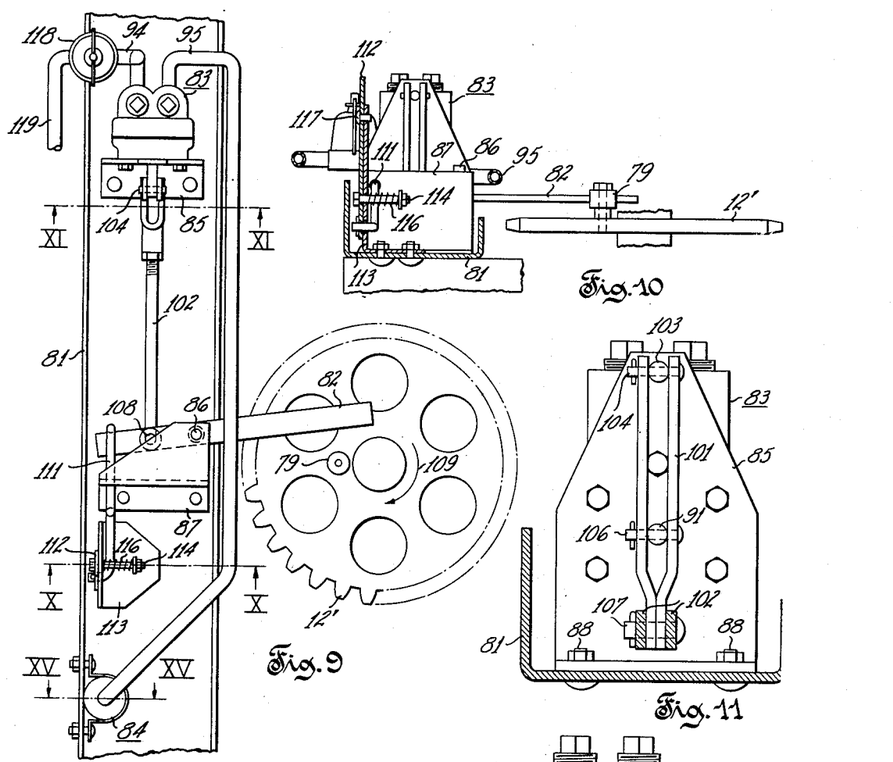
Fig. 9 is a top view of a modified fluid distributing system which may be used for supplying moistening fluid to rotary picking spindles of a cotton harvester.
Fig. 10 is an elevational view of parts shown in Fig. 9, the view being taken in section on line X—X of Fig. 9.
Fig. 11 is an elevational view, on an enlarged scale, of parts shown in Fig. 9, the view being taken in section on line XI—XI of Fig. 9.

The sprocket wheel 12' shown in Fig. 9 corresponds to the sprocket wheel 12 shown in Figs. 1 and 2, and mounts a cam roller or driving element 79 constituting part of power transmitting means at a fixed radial distance from the axis of the sprocket wheel 12'. A channel 81 which forms part of the picker main frame extends horizontally at a fixed distance from the axis of the sprocket wheel 12' and serves as a mounting base for several components, including a rocker 82, a fluid pump generally designated 83, and a fluid distributing manifold generally designated 84. The rocker 82 is formed by a straight piece of strap iron and is mounted for horizontal pivotal movement relative to the frame channel 81 by means of a vertical pivot pin 86. An angle clip 87 is secured to the web of the channel 81 and affords a bearing for the upper end of the pivot pin 86. In the assembled condition of the parts as shown in Fig. 9, an arm portion of the rocker 82 projects into the path of the cam roller 79 for actuation by the latter as will be more fully explained hereinbelow.

Figure 12:
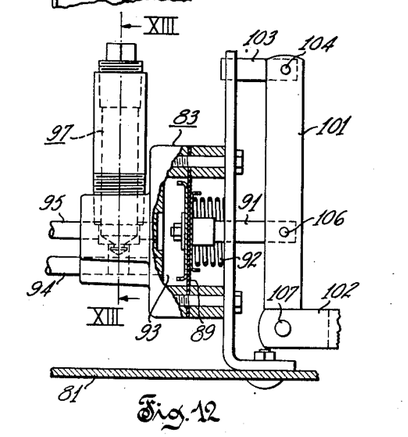
Fig. 12 is a side elevation, partly in section, of the mechanism shown in Fig. 11.
Figure 13:
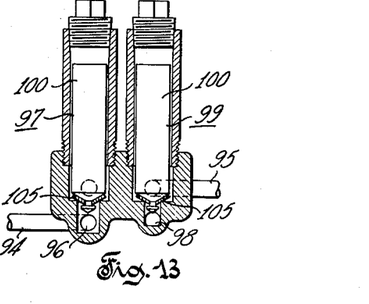
Fig. 13 is a section on line XIII—XIII of Fig. 12.

Referring to Figs. 9, 11 and 12, the pump 83 is secured to an upstanding bracket 85 on the frame channel 81 by means of bolts 88. A diaphragm 89, as shown in Fig. 12, mounts an actuating stem 91 for back and forth movement in a horizontal direction longitudinally of the channel 81, and a coil spring 92 biases the diaphragm and stem toward the left in Fig. 12. A suction and compression chamber 93 within the pump housing communicates in fluid receiving relation with a fluid supply duct 94 (Fig. 9), and in fluid delivering relation with intake means including a hose or pipe line 95. As shown in Figs. 12 and 13, the duct 94 is connected with an inlet passage 96 within the valve housing, and a check valve 97 controls the flow of liquid through the passage 96 and into the chamber 93. An outlet passage 98 within the pump housing communicates in fluid receiving relation with the pump chamber 93 and in fluid delivering relation with the hose or pipe line 95, and is controlled by a check valve 99. Each of the check valves comprises a solid, cylindrical plunger 100, and a resilient washer 105 snapped over a button at the conically shaped lower end of the plunger 100.

Movement of the diaphragm 89 and stem 91 in opposition to the coil spring 92 draws liquid from the pipe line 94 past the check valve 97 into the chamber 93, and movement of the diaphragm 89 and stem 91 in the opposite direction forces fluid out of the chamber 93 past the check valve 99 and into the hose or pipe line 95.

Reciprocating movement is transmitted to the stem 91 by means of a link mechanism which is operatively connected with the rocker 82 and which comprises a vertical link 101 and a horizontal pitman 102. The link 101 is pivotally mounted at its upper end on a stud 103 by means of a pivot pin 104, the stud 103 being fixedly secured to the upper end of the bracket 85. The stem 91 is pivotally connected with the link 101 intermediate the longitudinally opposite ends of the latter by means of a cross pin 106, and the lower end of the link 101 is pivotally connected with one end of the pitman 102 by means of a cross pin 107. The other end of the pitman 102 is pivotally connected at 108 with a portion of the rocker 82 at a fixed radial spacing from the pivot center 86.

When the sprocket wheel 12' rotates in the direction in which it is driven for normal operation of the machine and which is indicated by the arrow 109 in Fig. 9, the cam roller 79 intermittently cooperates with the rocker 82 so as to swing the latter in anticlockwise direction, as viewed in Fig. 9, about its pivot center to a predetermined limit position, and so as to subsequently release the rocker 82 for swinging movement about its pivot center 86 in the opposite direction. The return swinging movement of the rocker 82 is effected by the coil spring 92, and a mechanism for determining different limits of such return swinging movement of the rocker 82 is provided as follows: A reciprocable rod 111, best shown in Figs. 9 and 10, is slidably mounted for horizontal back and forth movement in the longitudinal direction of the channel 81, an intermediate portion of the rod 111 extending through a hole in a vertical web portion of the bracket 87. One end of the rod 111 is bent to form a hook which extends over the adjacent end of the rocker bar 82 to form a stop for limiting pivotal movement of the rocker 82 in clockwise direction as viewed in Fig. 9. The other end of rod 111 is pivotally connected with a manually operable adjusting lever 112 as best shown in Fig. 10. The lever 112 is pivotally mounted on an upstanding bracket 113 by means of a spring biased bolt 114. The bolt 114 extends through aligned holes in the lever 112 and bracket 113, and a coil spring 116 surrounding the bolt 114 tends to urge the lever 112 laterally against the bracket 113. At its lower end, the lever 112 is pivotally connected with the reciprocable rod 111, the latter having a hooked end portion which extends through an arcuate slot in the bracket 113 and through a hole in the lower end of the lever 112. A locking pin 117 is rigidly secured to an upper portion of the lever 112 and selectively engageable with any one of a series of holes which are formed in the bracket 113 on an arc concentric with the bolt 114 in a manner similar to that shown in Fig. 3 wherein lever 78 is provided with a locking pin selectively engageable with a series of holes.

In order to increase the amount of driving power which is transmitted from the sprocket wheel 12' to the pump 83, the reciprocable stop rod 111 may be adjusted by means of the hand lever 112 from the position in which it is shown in Fig. 9 toward the pump 83. Upon such adjustment of the rod 111 to a new position the rod 111 may be locked by engagement of the locking pin 117 with a registering hole in the bracket 113. On the other hand, in order to decrease the amount of driving power which is transmitted from the sprocket wheel 12' to the pump 83, the stop rod 111 may be similarly adjusted to a new position farther away from the pump 83.

The fluid supply duct 94, as shown in the upper part of Fig. 9 communicates with a fluid strainer 118 of conventional type as used in automobile fuel supply systems, and a hose or pipe line 119 connects the strainer 118 in fluid receiving relation with a suitable moistening fluid storage receptacle, such as the receptacle 77 indicated in Fig. 1.

Figures 14, 16:
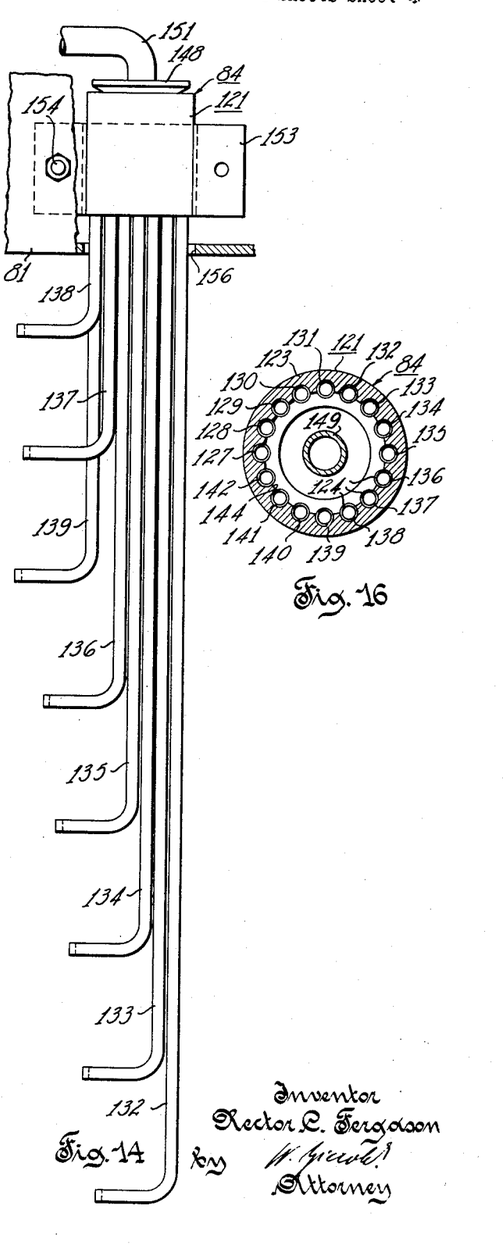
Fig. 14 is an elevational view, on an enlarged scale, of a fluid distributing manifold forming part of the system shown in Fig. 9.
Fig. 16 is a section on line XVI—XVI of Fig. 15.
Figure 15:
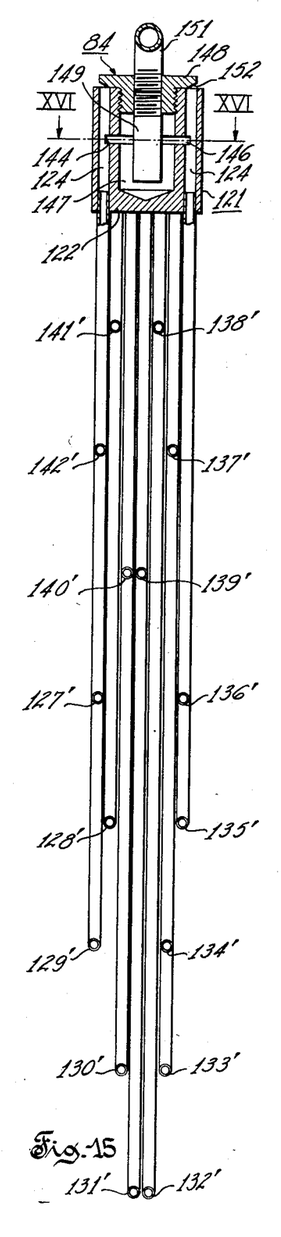
Fig. 15 is a side view of the manifold shown in Fig. 14, the view of Fig. 15 being taken partly in section on line XV—XV of Fig. 9.

The fluid intake means constituting hose or pipe line 95 (Figs. 9 and 13) which, as explained hereinbefore communicates with the fluid outlet passage 98 of the pump 83, is connected in fluid delivering relation with the fluid distributing manifold 84, the detailed construction of which is shown in Figs. 14, 15 and 16. As shown in these figures, the manifold 84 is somewhat similar to the manifold 39 shown in Figs. 6, 7 and 8, in that a fluid distributor casing 121 provides a fluid container for the accumulation of fluid delivered from the pump 83, and a series of pipes of varying lengths are connected in fluid receiving relation with the fluid distributor casing 121 and serve to conduct fluid to a vertical series of spindle moistening devices such as indicated at 33 in Fig. 6. It will be understood that the sixteen pipes, numbered 127 through 142 in Figs. 14, 15 and 16, are arranged in a form that is modified slightly from that shown in Fig. 6. Fig. 6 shows only nine of the sixteen pipes 41 shown in Fig. 8. Each pipe 41 of the assembly shown in Fig. 6 terminates at a separate level and is connected by a flexible rubber tube 37 to the moisteners 33. In the modified arrangement shown in Figs. 14, 15 and 16, the tubes 127 through 142 terminate in eight pairs with each pair at a separate level. Each tube is then connected by a flexible rubber tube similar to tube 37 to upper or lower adjacent moisteners 33 of the type shown in Fig. 6. Thus, for example, the rubber tube connected to tube 138' would be secured to the uppermost moistening device and the tube 141' to the next lower moistening device.

The fluid distributor casing 121 is formed from a solid piece of cylindrical bar stock, preferably brass, and has a bottom wall 122 and a relatively thick circumferential wall having a series of sixteen axial passages designated by the reference character 124, two of which are shown in Fig. 15. These passages 124 are formed in the circumferential wall 123 of the casing 121 as by drilling and extend clear through the casing from top to bottom. A series of sixteen pipes of varying lengths which are designated in Figs. 14, 15 and 16 by the reference characters 127 to 142, inclusive, are connected, respectively, with the sixteen axial passages 124 of the casing 121 and depend downwardly therefrom as shown in Figs. 14 and 15. The pipes 127 to 142 are arranged in pairs, a first pair of shortest length being formed by the pipes 138 and 141 which have open ends 138' and 141', respectively. A second pair of next longest pipes is formed by the pipes 137 and 142 which have open ends 137' and 142'. The third pair of next longest pipes is formed by the pipes 139 and 140 which have open ends 139' and 140'. A further pair of next longest pipes is formed by the pipes 127 and 136 which have open ends 127' and 136'. A fifth pair of next longest pipes is formed by the pipes 128 and 135 which have open ends 128' and 135'. A sixth pair of next longest pipes is formed by the pipes 129 and 134 which have open ends 129' and 134'. A seventh pair of next longest pipes is formed by the pipes 130 and 133 which have open ends 130' and 133'; and an eighth pair of longest pipes is formed by the pipes 131 and 132 which have open ends 131' and 132'. The various pipes 127 to 142 and their associated axial bores 124 of the casing 121 provide a plurality of fluid drain ducts of progressively increasing lengths for connecting the distributor casing 121 in gravity feed relation with a vertical series of moistening devices such as the moistening devices 33 in Fig. 6.

An annular groove 144 is formed within the casing 121 as shown in Figs. 15 and 16 to provide the individual drain ducts with inlet openings 146 at a level in upwardly spaced relation to the bottom wall 122. The inlet openings 146 communicate individually in fluid receiving relation with a central fluid accumulating space or well 147 within the casing 121. At its upper end, the circumferential wall 123 of the casing 121 is internally threaded to receive a cover or closure plug 148 which extends into the casing to a level substantially above the upper edge of the groove 144. A pipe nipple 149 is threaded into an axial central bore of the cover 148 and extends downwardly into the space 147. The lower open end of the nipple 149 provides a fluid discharge opening in fluid delivering relation with the casing 121 at a level below the level of the drain duct inlet openings 146. An elbow 151 is threaded into the upper part of the axial bore of the cover 148 and is connected to the hose or pipe line 95 in Fig. 9.

The cover or closure element 148 has a radially outwardly extending flange or circumferential skirt portion which has a conical lower surface 152 tapering downwardly toward the center of the casing 121. The conical surface 152 extends radially over the upper open ends of the axial passages 124 in nonclosing relation thereto, the purpose being to protect the upper inlet ends of the passages 124 against the entrance of trash which may accumulate on top of the cover 148, but at the same time leave the passages 124 open at their upper ends for venting purposes.

As shown in Figs. 9 and 14, the casing 121 is secured to one of the flanges of the channel 81 by means of a U-clip 153 and bolts and nuts 154. The pipes 127 to 142, inclusive, extend downwardly from the casing 121 through a hole 156 (Fig. 14) in the web of channel 81, and it will be understood that in the completed installation the casing 121 is positioned in elevated relation to a vertical series of spindle moistening devices such as the moistening devices 33 shown in Fig. 6.

In operation, the pump 83 is effective to deliver spindle moistening fluid in a pulsating manner through the pipe line 95, elbow 151 and nipple 149 into the fluid accumulating space or well 147. When the fluid accumulating in the space or well 147 rises to the level of the annular groove 144, moistening fluid will overflow into the passages 124 through the individual drain duct inlet openings 146 afforded by the intersections of the groove 144 with the axial passages 124. The fluid overflowing into the individual fluid drain ducts passes by gravity through the pipes 127 to 142, inclusive, to the individual moistening devices. Since each of the fluid drain ducts is vented at the upper end of its associated axial passage 124, as explained hereinbefore, all of the moistening devices will be evenly supplied with moistening fluid, and the possibility that the shorter pipes such as 137, 138 and 139 may be drained by siphoning action of the longer pipes 132, 133 is entirely eliminated.

It should be understood that it is not intended to limit the invention to the particular forms and details described hereinabove, and that the invention includes such other forms and modifications as are embraced by the scope of the appended claims.

It is claimed and desired to secure by Letters Patent:

1. In a cotton harvester of the type having a support, traveling spindle carrying slats mounted on said support and presenting spaced series of revolving picking spindles, moistening pads mounted on said support and engaged by said spindles, and a receptacle mounted on said support to provide a source of moistening fluid, the improvement comprising a container for distributing said moistening fluid having vertically spaced top and bottom walls, said container having an upper peripheral portion, fluid intake means connecting said receptacle with said container and having a terminal discharge end positioned in said container to direct incoming fluid toward said bottom wall, and pipes connecting said container with said moistening pads, said pipes being positioned around said upper periphery of said container with the intake ends of said pipes lying in a horizontal plane intermediate said top wall and said terminal discharge end of said fluid intake means.

2. For use in a cotton picker having a support, a series of spaced traveling spindles mounted on said support, a vertical series of spindle moistening devices mounted on said support for contact by said spindles, and a receptacle mounted on said support to provide a source of moistening fluid; the combination of a fluid distributor casing mounted on said support in elevated relation to said moistening devices and having a bottom wall and a circumferential wall rising from and connected with said bottom wall so as to form a fluid accumulating well within said casing, said circumferential wall having a series of vertical passages each open at the top and bottom ends of said casing and each connected in fluid receiving relation with said well by an overflow drain opening at a level intermediate said top and bottom ends of said casing, a closure element connected with a portion of said casing extending upwardly beyond said level of said drain openings so as to seal said well at its upper end, a plurality of drain pipes of progressively increasing lengths connected, respectively, in fluid receiving relation with the lower ends of said vertical passages connecting the latter in gravity feed relation with said moistening devices, respectively; and fluid intake means having a discharge opening positioned to direct incoming fluid from said source toward said bottom wall of said well.

3. In a cotton picker, the combination of a support, a movable power input element mounted on said support; a rotary spindle type picking mechanism operatively mounted on said support and connected with and driven by said input element at a speed proportional thereto, said mechanism including a series of spaced traveling spindles, a spindle moistening system including a receptacle mounted on said support to provide a source of fluid, a pump mounted on said support and having an actuating element, means connecting said pump in fluid receiving relation with said receptacle, a fluid container mounted on said support in elevated relation to said spindles, means connecting said pump with said container for delivering a free flow of fluid to the latter, and fluid distributing conduits disposed in fluid overflow receiving relation to said container and presenting terminal free ends positioned operatively adjacent the spindles to be moistened thereby, means connected to the terminal free ends of said conduits for applying moisture to said spindles, power transmitting means mounted on said support including a driving element positioned on said power input element, and drive means operatively connecting said driving element and said actuating element, the latter actuating said pump to discharge spindle moistening fluid to said container at a rate proportional to the speed of said input element, means mounting said driving element and actuating element in movable relation to each other and including a selectively adjustable control element operatively associated with one of said actuating and driving elements for moving said one element to and releasably retaining it in different positions of adjustment thereby causing delivery of spindle moistening fluid in different volumes without varying the operating speed of said picking mechanism.

4. In a cotton picker, the combination of a support, a movable power input element mounted on said support; a rotary spindle type picking mechanism operatively mounted on said support and connected with and driven by said input element at a speed proportional thereto, said mechanism including a series of spaced traveling spindles; a spindle moistening system including a receptacle mounted on said support to provide a source of fluid, a pump mounted on said support, means connecting said pump in fluid receiving relation with said receptacle, a container mounted on said support in elevated relation to said spindles, means connecting said pump with said container for delivering a flow of fluid to the latter, and fluid distributing conduits disposed in overflow receiving relation to said container and presenting terminal free ends positioned operatively adjacent the spindles to be moistened thereby, means connected to the terminal free ends of said conduits for applying moisture to said spindles, said pump having a pivoted swingable actuating element and operable to discharge spindle moistening fluid to said container at a rate proportional to the amplitude and speed of said actuating element, a jack shaft, means rotatably mounting said jack shaft on said support affording selective adjustment of said shaft transversely of its axis toward and away from said pump actuating element, said jack shaft having an eccentric portion positioned to engage and swing said pump actuating element about its pivot center upon rotation of said jack shaft on its axis, the extent of movement imparted to said pump actuating element being determined by the extent of transverse adjustment of said jack shaft relative to said pump actuating element, and power transmitting means operatively connecting said power input element in driving relation to said jack shaft.

5. In a cotton picker, the combination of elements set forth in claim 4, wherein said power transmitting means comprises a rotatable cam element connected in driven relation with said power input element, a lever pivotally mounted on said support in radially spaced relation to the axis of rotation of said cam element, said lever having an arm projecting into the path of movement of the latter, and a ratchet mechanism operatively connecting said lever and jack shaft.

6. In a cotton picker, the combination of a support, a movable power input element mounted on said support; a rotary spindle type picking mechanism operatively mounted on said support and connected with and driven by said input element at a speed proportional thereto, said mechanism including a series of spaced traveling spindles; a spindle moistening system including a receptacle mounted on said support to provide a source of fluid, a pump mounted on said support, means connecting said pump in fluid receiving relation with said receptacle, a container mounted on said support, means connecting said pump to said container for delivering a free flow of fluid to the latter, and fluid distributing conduits disposed in fluid overflow receiving relation to said container and presenting terminal free ends positioned operatively adjacent the spindles to be moistened, means connected to said terminal free ends of said conduits for applying moisture to said spindles, said pump having a pivotally mounted swingable actuating element, said pump operable to discharge spindle moistening fluid at a rate proportional to the amplitude and speed of back and forth movement of said actuating element, a link operatively connected at one of its ends with said actuating element at a predetermined distance from the pivotal mounting of the latter, a rocker operatively connected with the other end of said link, means pivotally mounting said rocker on said support at a point spaced a predetermined distance from the point of connection between said rocker and link, power transmitting means operatively connected with said power input element and intermittently engaging said rocker so as to swing the latter in one direction about its pivot mounting on said support to a predetermined limit position and so as to subsequently release said rocker for swinging movement about its pivot mounting in the opposite direction, and means including a stop element mounted in proximity to said rocker and selectively adjustable to different operative positions for determining different limits of swinging movement of said rocker in said opposite direction.

7. In a cotton picker, the combination of a support, a movable power input element mounted on said support; a rotary spindle type picking mechanism operatively mounted on said support and connected with and driven by said input element at a speed proportional thereto, said mechanism including a series of spaced traveling spindles; a spindle moistening system including a receptacle mounted on said support to provide a source of fluid, a pump mounted on said support, means connecting said pump in fluid receiving relation with said receptacle, a container mounted on said support, means connecting said pump to said container for delivering a free flow of fluid to the latter, and fluid distributing conduits disposed in fluid overflow receiving relation to said container and presenting terminal free ends positioned operatively adjacent the spindles to be moistened, said fluid pump having a pivotally mounted swingable actuating element, said pump operable to discharge spindle moistening fluid at a rate proportional to the amplitude and speed of back and forth movement of said actuating element, a link operatively connected at one of its ends with said actuating element at a predetermined distance from the pivotal mounting of the latter, a rocker operatively connected with the other end of said link, means pivotally mounting said rocker on said support at a point spaced a predetermined distance from the point of connection between said rocker and link, power transmitting means operatively connected with said power input element and intermittently engaging said rocker so as to swing the latter in one direction about its pivot mounting on said support to a predetermined limit position and so as to subsequently release said rocker for swinging movement about its pivot mounting in the opposite direction, a stop abuttable by said rocker so as to limit swinging movement of the latter in said opposite direction, and means mounting said stop for selective adjustment to different positions affording different limits of swinging movement of said rocker in said opposite direction.

8. In a cotton picker, the combination set forth in claim 7 wherein said rocker operating power transmitting means comprise a cam element connected with said power input element for movement in unison with the latter, and an arm portion on said rocker projecting into the path of movement of said cam element.

9. In a cotton harvester of the type having a support, a traveling spindle carrying slat mounted on said support and presenting a series of spaced spindles, and spindle moistening pads mounted on said support and engaged by said spindles; an improved means for distributing moistening fluid to said pads comprising, a receptacle mounted on said support to provide a source of moistening fluid, a fluid displacing pump mounted on said support and having the intake thereof communicating with said receptacle, means mounted on said support for driving said pump at a rate proportional to the speed of slat travel, a fluid container having vertically spaced top and bottom walls, means mounting said container on said support in elevated gravity feed relation to said moistening pads, means connecting said container with said pump and having a terminal discharge end positioned in said container to direct incoming fluid toward said bottom wall, said container also including fluid distributing conduits having their fluid inlet ends disposed in elevated overflow relation to the discharge end of said intake means, said outlet conduits having terminal lower ends positioned to direct discharge therefrom onto said moistening pads.

10. In a cotton harvester of the type having a support, a traveling spindle carrying slats mounted on said support and presenting series of vertically spaced spindles, spindle moistening pads mounted on said support for engagement with said spindles, and a receptacle mounted on said support to provide a source of moistening fluid; an improved fluid distributing means comprising a fluid container mounted on said support having top and bottom walls, fluid intake means communicating with said receptacle and having a terminal discharge end positioned in said container to direct incoming fluid toward said bottom wall, said container also including fluid distributing conduits having fluid inlet ends disposed in elevated overflow relation to the discharge end of said intake means, said distributing conduits having terminal lower ends positioned to direct fluid discharged therefrom onto said moistening pads.

11. In a cotton harvester of the type having a support, a traveling spindle carrying slat mounted on said support and presenting a series of vertically spaced spindles, spindle moistening pads mounted on said support and engaged by said spindles and a receptacle mounted on said support to provide a source of moistening fluid; an improved fluid distributing means comprising a fluid container mounted on said support including means forming a generally circular imperforate bottom wall surrounded by a circumferential series of vertically disposed fluid conduits having inlet ends terminating in uniform elevated relation to said bottom wall; a closure wall structure affixed to said conduits and presenting a cover element disposed in spaced elevated relation to said inlet ends of said conduits; and fluid intake means connected with said receptacle and having a terminal discharge end positioned in said container to direct incoming fluid toward said bottom wall, said fluid conduits having their inlet ends disposed in elevated overflow receiving relation to the discharge end of said intake means and having terminal lower ends positioned to direct fluid discharged therefrom onto said moistening pads.

12. For use in a cotton picker having a support, a series of spaced traveling spindles mounted on said support and a spaced series of spindle moistening devices positioned on said support to be engaged by said series of spaced traveling spindles; the combination of a receptacle mounted on said support to provide a source of fluid, a fluid confining and distributing casing positioned on said support in elevated relation to said moistening devices and comprising a cover element, a bottom wall, a circumferential wall rising from said bottom wall, fluid intake means connecting said receptacle with said casing and having a discharge opening in fluid delivering relation with said casing at a level above said bottom wall and positioned to direct incoming fluid toward said bottom wall, a plurality of gravity feed fluid drain ducts having their inlet openings disposed in elevated overflow relation to the discharge end of said intake means, said ducts being of progressively increasing lengths and having terminal lower ends positioned to direct fluid discharged therefrom onto said moistening devices.

13. For use in a cotton picker having a support, a series of spaced traveling spindles mounted on said support and a spaced series of spindle moistening devices positioned on said support to be engaged by said series of spaced traveling spindles; the combination of a receptacle mounted on said support to provide a source of fluid, a fluid confining and distributing casing positioned on said support in elevated relation to said moistening devices and comprising a cover element, a bottom wall, a circumferential wall rising from said bottom wall, fluid intake means connecting said receptacle with said casing and having a discharge opening in fluid delivering relation with said casing at a level above said bottom wall, and positioned to direct incoming fluid toward said bottom wall, a plurality of gravity feed fluid drain ducts disposed in side opposed contiguous water tight relation to form said circumferential wall, said ducts having their inlet openings disposed in elevated overflow relation to the discharge end of said intake means, said ducts being of progressively increasing lengths and having terminal lower ends positioned to direct fluid discharged therefrom onto said moistening devices.

14. For use in a cotton picker having a support, a series of spaced traveling spindles mounted on said support and a spaced series of spindle moistening devices positioned on said support to be engaged by said series of spaced traveling spindles; the combination of a receptacle mounted on said support to provide a source of fluid, a fluid confining and distributing casing positioned on said support in elevated relation to said moistening devices and comprising a cover element, a bottom wall and a circumferential wall rising from said bottom wall, fluid intake means connecting said receptacle with said casing and having a discharge opening in fluid delivering relation with said casing at a level above said bottom wall and positioned to direct incoming fluid toward said bottom wall, a plurality of gravity feed fluid drain ducts having their inlet openings disposed in elevated overflow relation to the discharge end of said intake means, said ducts being of progressively increasing lengths and having terminal lower ends positioned to direct fluid discharged therefrom onto said moistening devices, and air passage means operatively associated with said fluid drain ducts for venting the latter.

15. For use in a cotton picker having a support, a series of spaced traveling spindles mounted on said support and a spaced series of spindle moistening devices positioned on said support to be engaged by said series of spaced traveling spindles; the combination of a receptacle mounted on said support to provide a source of fluid, a fluid confining and distributing casing positioned on said support in elevated relation to said moistening devices and comprising a cover element, a bottom wall, a circumferential wall rising from said bottom wall, fluid intake means connecting said receptacle with said casing and having a discharge opening in fluid delivering relation with said casing at a level above said bottom wall and positioned to direct incoming fluid toward said bottom wall, a plurality of gravity feed fluid drain ducts having their inlet openings disposed in elevated overflow relation to the discharge end of said intake means, said ducts being of progressively increasing lengths and having terminal lower ends positioned to direct fluid discharged therefrom onto said moistening devices, and vent ducts formed in said casing and individually communicating with said fluid drain ducts, respectively, at a level above said level of said drain duct inlet openings.

16. For use in a cotton picker having a support, a series of spaced traveling spindles mounted on said support, a vertical series of spindle moistening devices positioned on said support and a receptacle on said support providing a source of moistening fluid; the combination of a fluid distributor casing positioned on said support in elevated relation to said moistening devices and having a bottom wall and a circumferential wall rising from and connected with said bottom wall so as to form a fluid accumulating well within said casing, said circumferential wall having a series of vertical passages each open at the top and bottom ends of said casing and each connected in overflow receiving relation with said well by a fluid drain opening at a level intermediate said top and bottom walls of said casing, a closure element connected with a portion of said casing extending upwardly beyond said level of said drain openings so as to seal said well at its upper end, said closure element having a circumferential skirt portion extending radially over and in nonclosing relation to the upper open ends of said vertical passages, a plurality of drain pipes of progressively increasing lengths connected, respectively, in fluid receiving relation with the lower ends of said vertical passages connecting the latter in gravity feed relation with said moistening devices, respectively; and fluid intake means connecting said receptacle with said casing and having a discharge opening located in downwardly spaced relation to said level of said fluid drain openings and positioned to direct incoming fluid from said source toward said bottom wall of said well.

(References on following page)

References Cited in the file of this patent

UNITED STATES PATENTS

| | | |
|---|---|---|
| 1,945,181 | Carter | Jan. 30, 1934 |
| 1,958,689 | Ball et al. | May 15, 1934 |
| 1,988,797 | Hueber et al. | Jan. 22, 1935 |
| 2,018,111 | Babitch | Oct. 22, 1935 |
| 2,084,755 | Young | June 22, 1937 |
| 2,126,364 | Witzel | Aug. 9, 1938 |
| 2,126,847 | Weiss | Aug. 16, 1938 |
| 2,193,696 | Ramsaur | Mar. 12, 1940 |
| 2,225,498 | Hollander | Dec. 17, 1940 |
| 2,341,894 | Bariffi | Feb. 15, 1944 |
| 2,369,708 | Baker et al. | Feb. 20, 1945 |
| 2,433,083 | Baker et al. | Dec. 23, 1947 |
| 2,525,184 | Rust | Oct. 10, 1950 |
| 2,567,301 | Rust | Sept. 11, 1951 |
| 2,654,204 | Grosvenor | Oct. 6, 1953 |